(12) United States Patent
Novoselov et al.

(10) Patent No.: US 9,019,589 B2
(45) Date of Patent: Apr. 28, 2015

(54) ELECTROWETTING DEVICE

(71) Applicant: Liquavista B.V., Eindhoven (NL)

(72) Inventors: Pavel Novoselov, Eindhoven (NL); Toru Sakai, Waalre (NL); Henricus Petronella Maria Derckx, Weert (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/305,658

(22) Filed: Jun. 16, 2014

(65) Prior Publication Data

US 2014/0293397 A1    Oct. 2, 2014

Related U.S. Application Data

(63) Continuation of application No. PCT/EP2012/075589, filed on Dec. 14, 2012.

(30) Foreign Application Priority Data

Dec. 16, 2011    (GB) .................................... 1121710.6

(51) Int. Cl.
     *G02B 26/00*      (2006.01)
     *G09G 3/34*      (2006.01)
     *G02B 26/02*      (2006.01)
     *G09G 5/00*      (2006.01)

(52) U.S. Cl.
     CPC .............. *G02B 26/005* (2013.01); *G02B 26/00* (2013.01); *G02B 26/004* (2013.01); *G02B 26/02* (2013.01); *G09G 3/348* (2013.01); *G09G 2310/0289* (2013.01); *G09G 2320/04* (2013.01); *G09G 5/00* (2013.01); *G02B 2207/115* (2013.01)

(58) Field of Classification Search
     CPC .... G02B 26/00; G02B 26/004; G02B 26/005; G02B 26/02; G02B 2207/115; G09G 3/348; G09G 5/00; G09G 2300/0426; G09G 2310/0289; G09G 2320/0219; G09G 2320/04
     USPC ............ 359/245, 228, 290, 291, 296; 345/60, 345/212, 214, 690; 216/13, 20
     See application file for complete search history.

(56) References Cited

U.S. PATENT DOCUMENTS

| | | | |
|---|---|---|---|
| 8,743,450 B2 * | 6/2014 | Massard et al. ............... | 359/290 |
| 8,896,903 B2 * | 11/2014 | Vermeulen et al. ........... | 359/290 |
| 8,896,904 B2 * | 11/2014 | Massard et al. ............... | 359/290 |
| 2013/0250396 A1 * | 9/2013 | Kim et al. ..................... | 359/290 |
| 2014/0218351 A1 * | 8/2014 | Feenstra et al. ............... | 345/212 |
| 2014/0285869 A1 * | 9/2014 | Giraldo ......................... | 359/290 |
| 2014/0293395 A1 * | 10/2014 | Hendriks et al. .............. | 359/290 |

FOREIGN PATENT DOCUMENTS

| | | |
|---|---|---|
| WO | 03/071346 A1 | 8/2003 |
| WO | 2004/104670 A1 | 12/2004 |
| WO | 2005/098797 A2 | 10/2005 |
| WO | 2007/141218 A1 | 12/2007 |
| WO | 2007/141220 A1 | 12/2007 |

(Continued)

*Primary Examiner* — Loha Ben
(74) *Attorney, Agent, or Firm* — BainwoodHuang

(57) ABSTRACT

An electrowetting display device comprising a picture element comprising a first fluid and a second fluid immiscible with the first fluid. At least one wall comprises a first surface and a second surface at different locations on a perimeter of a display area, the first surface being less wettable to the second fluid than the second surface.

25 Claims, 4 Drawing Sheets

(56) References Cited

FOREIGN PATENT DOCUMENTS

| WO | 2009/065909 | A1 | 5/2009 |
| WO | 2009/071676 | A1 | 6/2009 |
| WO | 2011/058019 | A1 | 5/2011 |
| WO | 2011/113787 | A1 | 9/2011 |

* cited by examiner

ELECTROWETTING DEVICE

CROSS REFERENCE TO RELATED APPLICATIONS

This application is a continuation of PCT International Application No. PCT/EP2012/075589 filed Dec. 14, 2012.

BACKGROUND

In a known electrowetting display device, a configuration of an oil layer may be switched to change a display effect with application of a voltage.

It is desirable to provide an electrowetting display device with improved operation.

DETAILED DESCRIPTION

Figure 1:
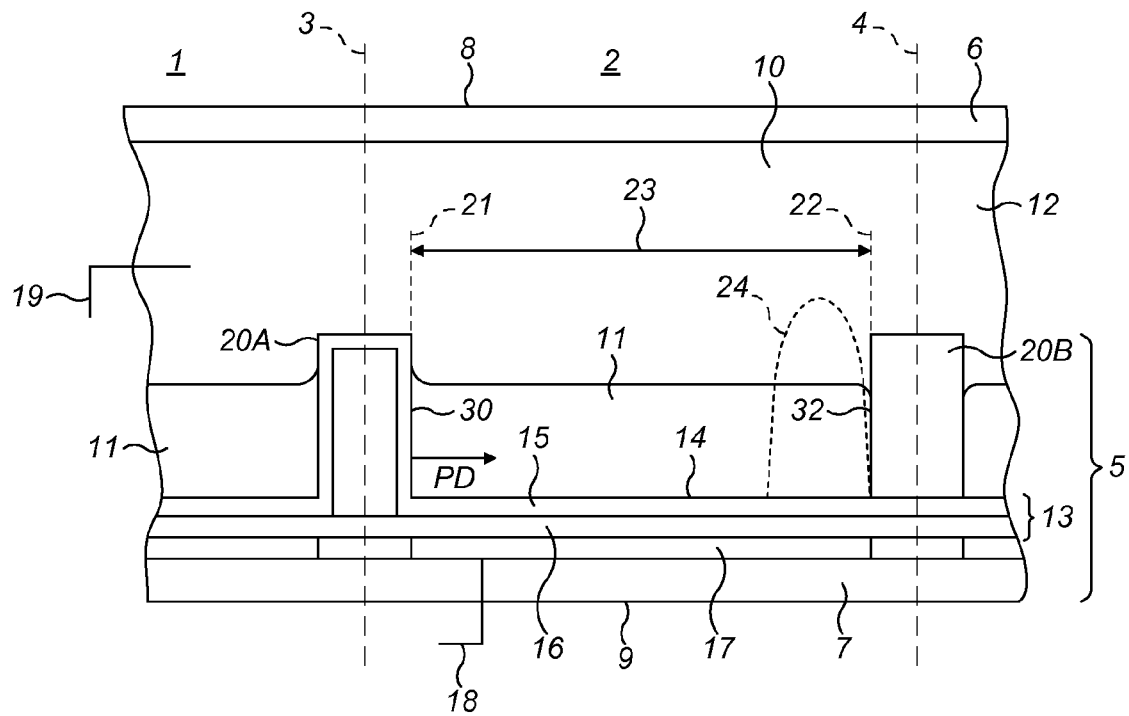
FIG. 1 shows schematically a cross section of an electrowetting display device according to an embodiment.

The entire contents of the following applications are incorporated by reference herein:
PCT/EP2012/075589 filed Dec. 14, 2012 and
GB 1121710.6 filed Dec. 16, 2011.

Embodiments described herein relate to an electrowetting device, particularly an electrowetting display device.

In accordance with first embodiments, there is provided an electrowetting display device comprising a picture element comprising a first fluid and a second fluid immiscible with the first fluid, the picture element having a display area and at least one wall defining a perimeter of the display area and confining the first fluid to the display area, wherein the at least one wall comprises a first surface and a second surface at different locations on the perimeter, the first surface being less wettable to the second fluid than the second surface.

The first and second surfaces have different wettabilities to the second fluid. This therefore provides a new parameter for determining characteristics of an electrowetting display device; for example, fluid switching behaviour or a preferential point of initiation of fluid motion when applying a voltage to the second fluid may be controlled.

A known electrowetting display device comprises walls with a stacked hydrophobic part and hydrophilic part. This is different from the present embodiments with surfaces of different wettabilities at different locations on the perimeter.

In some embodiments, a configuration of the first and second fluids may be switchable in dependence on a voltage applied to the second fluid, wherein when switching from a first configuration with a zero applied voltage, to a different, second configuration with a non-zero applied voltage, a motion of the first fluid initiates at the first surface before initiating at the second surface. In this way the different wettabilities of the first and second surfaces, at different locations on the perimeter, can be used to determine where fluid motion initiates when applying a voltage to the second fluid. Initiation occurs at the first surface (which is e.g. hydrophobic) before the second surface (which is e.g. hydrophilic). This is due to lower friction between the second fluid and the first surface, compared with the second fluid and the second surface, when switching the fluids from the first configuration to the second configuration. Exploiting this lower friction at the first surface allows a significantly lower voltage than known devices to be used to initiate fluid motion and consequently to switch the picture element from the first configuration to the second configuration. The picture element therefore has a lower power consumption. The lower voltage also gives a longer lifetime of components of the display device, for example a TFT and a barrier layer, which under a higher voltage of known devices would degrade faster. Further, the better switching performance gives rise to better optical performance; for example, the fluid motion in the picture element is more consistent and efficient as, rather than breaking up at an undefined position, the first fluid may for example collect at one side of the picture element. This gives for example a larger white area in the picture element and improved grey scaling. Since a lower switching voltage is required, cheaper electronic components are required such as an AC-DC or DC-DC converter, meaning the resulting display device is cheaper to manufacture.

Indeed, the lower friction at the first surface is surprising; a known device controls oil motion using surfaces with different wettabilities on the display area. However, this is different as in the present embodiments the at least one wall comprises the first and second surfaces of different wettabilities. Moreover, in the embodiments, initiation occurs first at the surface less wettable to the second fluid; the known device is completely different as preferential initiation occurs at the surface more wettable to the second fluid.

In embodiments, the at least one wall may comprise a third surface and a fourth surface each having substantially the same wettability to the second fluid as the first surface. The at least one wall may have more than two surfaces with selected wettabilities. For example, in a square or rectangular picture element, each side of the picture element may have a wettability selected to determine properties of the picture element, for example a switching voltage, fluid motion direction or fluid motion initiation. In this embodiment three surfaces, for example three sides of the picture element, have substantially the same wettability. The term "substantially" is defined as a degree of variation between the wettabilities of the surfaces which does not detract from the intended property provided by the surfaces, for example the initiation point or preferential direction of motion.

In alternative embodiments the at least one wall comprises a third surface having substantially the same wettability to the second fluid as the first surface, and a fourth surface having substantially the same wettability to the second fluid as the second surface. In such embodiments, the first and third surface, which may define two sides of the picture element, have substantially the same wettability as each other. The second and fourth surfaces, which may define a further two sides of the picture element, have substantially the same wettability as each other, this wettability being different from that of the first and third surfaces. Please see above for the definition of "substantially". In such alternative embodiments, a property of the picture element, for example the initiation point or preferential direction of fluid motion, may be controlled differently from previous embodiments. Thus a designer of a picture element has various options, and therefore greater design freedom, for providing a desired behaviour of the picture element.

In examples, the first, second, third and fourth surfaces define a square or rectangular display area perimeter. Thus, each surface may define a different side of the picture element. In other embodiments, the at least one wall may define a display area of an alternative shape, for example a hexagon. It is thus to be appreciated that the picture element may comprise more than four sides.

The first surface and the second surface may be arranged relative to each other to define a preferential direction of motion of the first fluid when switching from the first configuration to the second configuration. With appropriate arrangement relative to each other, as the skilled person would understand, the first and second surfaces may define a preferential direction of fluid motion, thus providing a picture element with a reliable, consistent and accurate fluid motion when switching between different fluid configurations. This allows a high quality image to be provided by the display device. The first and second surfaces may therefore be used to define an initiation point for fluid motion and a preferential direction of first fluid motion.

Alternatively, for example, the first, second, third and fourth surfaces may be arranged relative to each other to define a preferential direction of motion of the first fluid when switching from the first configuration to the second configuration. Thus, compared with the previously described embodiment, the third and fourth surfaces may also be used to define a preferential direction of fluid motion, giving similarities with the previously described embodiment.

In further embodiments, when a zero voltage is applied to the second fluid, the first fluid wets the first surface with a first contact angle and the first fluid wets the second surface with a second contact angle, the first contact angle being less than the second contact angle. For example, the first contact angle may be less than 90 degrees, meaning the first surface has an affinity for being wet by the first fluid. Further, for example, the second contact angle may be greater than 90 degrees, 95 degrees or 100 degrees, meaning the second surface has an affinity for being wet by the second fluid rather than the first fluid.

The contact angle parameter is known in the art and is defined herein as the angle between the tangent of a fluid meniscus and a surface of a solid, the tangent being taken from the point where the meniscus adjoins the surface. The fluid meniscus in this case is the meniscus between the first and second fluids. The contact angle may be defined in relation to the first fluid or the second fluid. The appropriate fluid will be referred to below when giving examples of contact angles.

In embodiments, when a zero voltage is applied to the second fluid, the first surface and the second surface may be wet by only the first fluid, or in other embodiments by both the first and second fluids. In the latter, the second fluid may wet the first surface with a third contact angle and the second fluid may wet the second surface with a fourth contact angle, the third contact angle being greater than the fourth contact angle. For example, the third contact angle may be greater than 90 degrees. The fourth contact angle may be less than 90 degrees, 85 degrees or 80 degrees. For example the third contact angle may be 100 degrees and the picture element switches configuration with a voltage of 5 V.

The first surface may be hydrophobic and the second surface may be hydrophilic. The terms "hydrophobic" and "hydrophilic" are defined with respect to a surface's wettability to water; a "hydrophobic" surface does not have an affinity for being wet by water, whereas a "hydrophilic" surface does have an affinity for being wet by water. Thus, in an example where the first fluid is an oil comprising an alkane and the second fluid is for example an aqueous sodium chloride solution, the first surface has an affinity for the oil and the second surface has an affinity for the electrolyte at zero volts. The first surface may be Teflon® and the second surface may be SU8.

In some embodiments, a surface of the display area facing the first and second fluids joins the first surface and has substantially the same wettability to the second fluid as the first surface. Such embodiments provide smooth and low voltage switching of the picture element, since on application of a voltage to the second fluid, the second fluid may flow down the first surface and onto the display area surface smoothly and with low friction.

Further, the first surface and the surface of the display area may be formed from a continuous layer of material less wettable to the second fluid than the second surface. Thus, a smooth join is provided between the first surface and the display area surface, thus giving the effects of the previous embodiment in a simple manner.

In certain embodiments, the continuous layer may comprise the third and maybe also the fourth surface. Thus, where the at least one wall comprises a third surface and possibly a fourth surface, as described above, a smooth join may be formed with those surfaces and the display area surface to provide smooth and low voltage picture element switching.

According to second embodiments, there is provided a support plate for an electrowetting display device comprising a picture element comprising a first fluid and a second fluid immiscible with the first fluid, the support plate comprising a display area for a picture element and at least one wall defining a perimeter of the display area and suitable for confining the first fluid to the display area, wherein the at least one wall comprises a first surface and a second surface at different locations of the perimeter, the first surface being less wettable for the second fluid than the second surface. Such a support plate may be assembled in an electrowetting display device to provide features of previously described embodiments in the device.

According to third embodiments, there is provided an electrowetting device comprising a first fluid, a second fluid immiscible with the first fluid, and at least one wall confining the first fluid, wherein the at least one wall comprises a first surface which, when a zero voltage is applied to the second fluid, is wet by the first fluid with a first contact angle of less than 90 degrees. Thus, the first surface has an affinity for being wet by the first fluid. When switching the electrowetting device from a fluid configuration with a zero voltage applied to the second fluid, to a different, second fluid configuration with a non-zero voltage applied, the first surface provides low friction between the second fluid and the at least one wall. As explained above, this allows a low voltage to be used to switch the fluid configuration. The electrowetting device may be an electrowetting display device comprising a picture element which comprises the first and second fluids, the at least one wall defining a perimeter of a display area of the picture element.

It is noted that a known electrowetting display device with pixel walls has a hydrophobic lower layer of the walls, and a hydrophilic upper layer of the walls. Wetting of the lower hydrophobic wall part by the oil ensures a homogeneous optical off-state. Further, in the known device, the hydrophilic part, which is less wettable to the oil, is essential for good switching; this is contrary to the present embodiments where the first surface is more wettable to the first fluid.

In some embodiments, the first surface extends over a height of the at least one wall. Thus, the first surface may run from a base to a top of a wall defining a side of a picture element. This provides low friction switching of the second fluid continuously down the part of the at least one wall with the first surface. In other embodiments, the first surface may be a face of the at least one wall. Thus, for example, the face of a wall defining a side of a picture element and facing the first and second fluids may be the first surface, meaning the low friction switching is provided across the face.

The first surface may be hydrophobic. Therefore, for example where the first fluid is oil and the second fluid is a sodium chloride aqueous solution, there is low friction between the first surface and the second fluid when switching from the first configuration of the fluids to the second configuration. The first contact angle may be less than 85 degrees or 80 degrees. In further embodiments, when a zero voltage is applied to the second fluid, the second fluid may wet the first surface with a second contact angle of greater than 90 degrees. Therefore, in embodiments where the second fluid contacts the first surface in the first configuration of the fluids, there is a lower affinity for the second fluid to wet the first surface than the first fluid.

In accordance with fourth embodiments, there is provided a support plate for an electrowetting display device comprising a picture element comprising a first fluid and a second fluid immiscible with the first fluid, the support plate comprising a display area for a picture element and at least one wall defining a perimeter of the display area and suitable for confining the first fluid to the display area, wherein the at least one wall comprises a first surface which, when a zero voltage is applied to the second fluid, is wet by the first fluid with a first contact angle of less than 90 degrees.

Examples of embodiments will now be described in detail.

FIG. 1 shows a diagrammatic cross-section of part of an electrowetting device in the form of an electrowetting display device 1. The display device includes a plurality of picture elements 2, one of which is shown in the Figure. The lateral extent of the picture element is indicated in the Figure by two dashed lines 3, 4. The picture elements comprise a first support plate 5 and a second support plate 6. The support plates may be separate parts of each picture element, but the support plates may instead be shared in common by the plurality of picture elements. The support plates may include a glass or polymer substrate 6, 7 and may be rigid or flexible.

The display device has a viewing side 8 on which an image or display formed by the display device can be viewed and a rear side 9. In the Figure the first support plate 5 faces the rear side 9; the second support plate 6 faces the viewing side; alternatively, the first support plate may face the viewing side. The display device may be of the reflective, transmissive or transflective type. The display device may be of a segmented display type in which the image may be built up of segments, each segment including several picture elements. The display device may be an active matrix driven display type or a passively driven display device. The plurality of picture elements may be monochrome. For a colour display device the picture elements may be divided in groups, each group having a different colour; alternatively, an individual picture element may be able to show different colours.

A space 10 between the support plates is filled with two fluids: a first fluid 11 and a second fluid 12, at least one of which may for example be a liquid. The second fluid is immiscible with the first fluid. The second fluid is electrically conductive or polar, and may be water or a salt solution such as a solution of potassium chloride in water. The second fluid may be transparent, but may alternatively be coloured, white, absorbing or reflecting. The first fluid is electrically non-conductive and may for instance be an alkane like hexadecane or (silicone) oil.

The first fluid absorbs at least a part of the optical spectrum. The first fluid may be transmissive for a part of the optical spectrum, forming a colour filter. For this purpose the first fluid may be coloured by addition of pigment particles or dye. Alternatively, the first fluid may be black, i.e. absorb substantially all parts of the optical spectrum, or reflecting. A reflective layer may reflect the entire visible spectrum, making the layer appear white, or part of it, making it have a colour.

The support plate 5 includes an insulating layer 13. The insulating layer may be transparent or reflective. The insulating layer may be a hydrophobic layer; alternatively, it may include a hydrophobic layer 15 and a barrier layer 16 with predetermined dielectric properties, the hydrophobic layer 15 facing the space 10, as shown in the Figure. In the latter example, the barrier layer 16 may extend between walls of a picture element, with the hydrophobic layer extending under certain walls of the picture element, but not extending under other walls, as will be explained later. The barrier layer 16 may have a thickness, taken in a direction perpendicular the plane of the substrate, between 100 nm and 150 nm and may be made of an inorganic material like silicon oxide or silicon nitride or a stack of these (for example, silicon oxide-silicon nitride-silicon oxide) or an organic material like polyimide or parylene. The barrier layer may comprise multiple layers having different dielectric constants.

Each element 2 includes an electrode 17 as part of the support plate 5. The electrode 17 is separated from the fluids by the insulating layer 13; electrodes of neighbouring picture elements are separated by a non-conducting layer. Other layers may be arranged between the insulating layer 13 and the electrode 17. The electrode 17 can be of any desired shape or form. The electrode 17 of a picture element is supplied with voltage signals by a signal line 18, schematically indicated in the Figure. A second signal line 19 is connected to an electrode that is in contact with the conductive second fluid 12. This electrode may be common to all elements, when they are fluidly interconnected by and share the second fluid, uninterrupted by walls. The picture element 2 can be controlled by a voltage V applied between the signal lines 18 and 19. The electrodes 17 on the substrate 7 are coupled to a display driving system. In a display device having the picture elements arranged in a matrix form, the electrodes can be coupled to a matrix of control lines on the substrate 7.

The first fluid 11 is confined to one picture element by at least one wall that follows the perimeter of the picture element. The perimeter of a picture element may have any shape, for example circular or with a plurality of walls defining a plurality of sides of the picture element, for example a triangular perimeter. When the picture elements are arranged in a matrix form, the picture element cross-section is usually square or rectangular, defined by four walls. FIG. 1 illustrates a cross section of a square picture element which is defined by four walls.

In this embodiment, a first wall of the four walls is illustrated in FIG. 1 as the left hand wall 20A, which protrudes from the barrier layer 16. Of the other three walls, namely a second, third and fourth wall, the third and fourth walls also protrude from the barrier layer 16 and the second wall protrudes from the hydrophobic layer 15; the second wall is illustrated in FIG. 1 as the right hand wall 20B. Further details of the construction of the walls will be described later.

The walls may extend from the first to the second support plate but may instead extend partly from the first support plate to the second support plate as shown in FIG. 1; in the latter case, the second support plate may comprise further walls which protrude from the second support plate and abut the top of the walls of the first support plate. The walls of the second support plate may have a different wettability to the first and/or second fluids than the walls of the first support plate, thus providing more options for controlling the configuration of the fluids.

The extent of the picture element, indicated by the dashed lines 3 and 4, is defined by the centre of the walls. The area between the walls of a picture element, indicated by the dashed lines 21 and 22, is called the display area 23, over which a display effect occurs.

Figure 2:
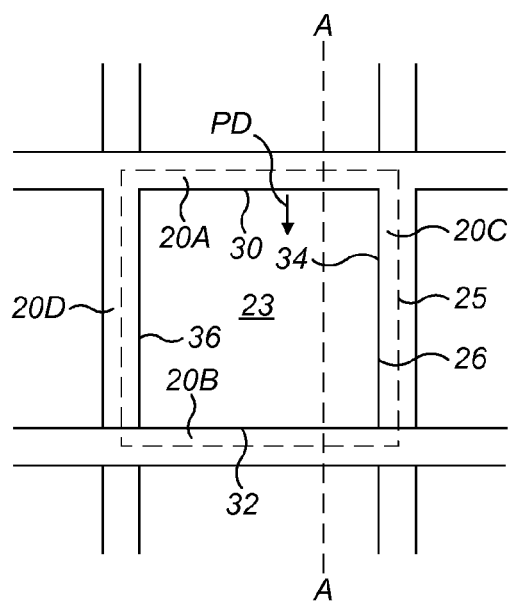
FIG. 2 shows a plan view of a first support plate of an embodiment.

In relation to the embodiment of FIG. 1, FIG. 2 shows a matrix of square picture elements in a plan view of the first support plate. The extent of the central picture element in FIG. 2, corresponding to the dashed lines 3 and 4 in FIG. 1, is indicated by the dashed line 25. Line 26 indicates the inner border of a wall; the line is also the edge of the display area 23. The first, second, third and fourth walls 20A, 20B, 20C and 20D respectively are illustrated in FIG. 2, which shows also the plane A-A of the cross section of FIG. 1. As shown in FIG. 2, the second wall 20B is a separate structure from the other three walls 20A, 20C and 20D which may be formed together as one structure.

The at least one wall, in this embodiment the four walls 20A, 20B, 20C and 20D, therefore define a perimeter of the display area 23, the perimeter being indicated by the line 26. The at least one wall comprises a first surface and a second surface at different locations on the perimeter. In this embodiment, the at least one wall comprises a third surface and a fourth surface also, at different locations on the perimeter. Any of the first, second, third and fourth surfaces may extend over a total height of the at least one wall. Specifically in this example a face of the first wall is a first surface 30, a face of the second wall is a second surface 32, a face of the third wall is a third surface 34 and a face of the fourth wall is a fourth surface 36. Each of these faces is facing into the space 10 and towards another of the walls. In this example the four surfaces define a square display area perimeter, but may instead define a rectangular perimeter.

A configuration of the first and second fluids is switchable in dependence on a voltage applied to the second fluid. When a zero voltage, i.e. no voltage, is applied between the electrodes, the first fluid 11 forms a layer between the walls, with a layer of the second fluid lying thereon, as shown in FIG. 1. This fluid configuration is referred to as the first configuration. Application of a sufficiently large non-zero voltage to the second fluid will contract the first fluid, for example against the second wall 20B as shown by the dashed shape 24 in FIG. 1, which different fluid configuration is referred to as the second configuration. Thus the fluids are switched from the first configuration to the second configuration. The controllable shape of the first fluid is used to operate the picture element as a light valve, providing a display effect over the display area 23.

Figure 3:
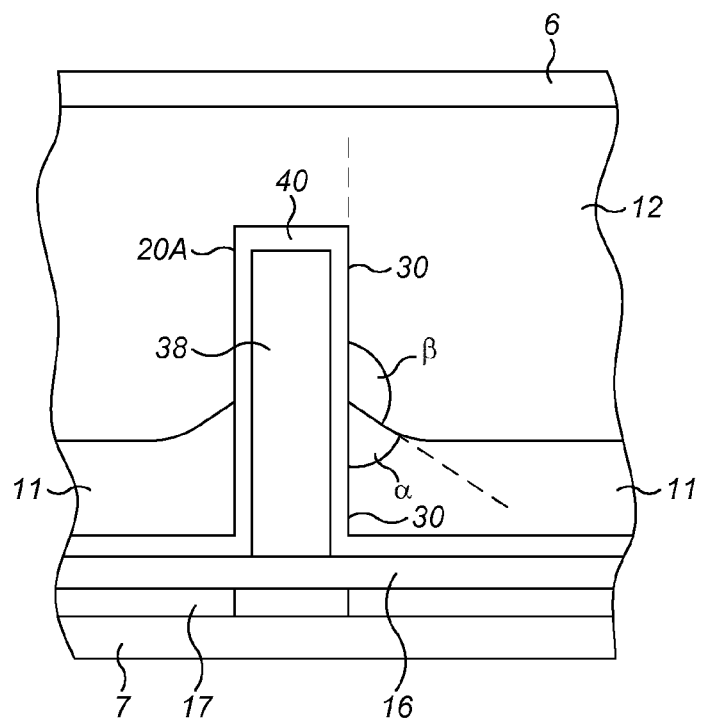
FIG. 3 shows schematically an enlarged part of FIG. 1.

FIG. 3 shows an enlarged part of FIG. 1, particularly the first wall 20A. The first wall 20A in this embodiment comprises a wall structure 38 formed on the barrier layer 16 and coated with a layer of material 40 which provides the first surface 30. In this example the third and fourth surfaces 34 and 36 are formed in a similar manner. The second surface is provided by the material from which the second wall is formed.

In this embodiment the surface of the display area facing the first and second fluids joins the first surface and has substantially the same wettability to the second fluid as the first surface. Further, the first surface and the surface of the display area are formed from a continuous layer of material less wettable to the second fluid than the second surface. In this example the layer of material 40 continues from the first wall to form the hydrophobic layer 15 which provides the surface of the display area 23. In an alternative embodiment, the first surface and the surface of the display area may not be a continuous layer but instead may be formed of different materials each with the same wettability with respect to the second fluid.

In the first configuration, when a zero voltage is applied, the first fluid wets the first surface with a first contact angle α schematically illustrated in FIG. 3. The first fluid wets the second surface with a second contact angle (not indicated). The first contact angle is less than the second contact angle, as the first surface is more wettable to the first fluid than the second surface. In this embodiment the first contact angle is less than 90 degrees, and may for example be 85 or 80 degrees, and the second contact angle is greater than 90 degrees and may for example be 95 degrees or 100 degrees. In this embodiment, the third and fourth surfaces each have substantially the same wettability to the first fluid as the first surface. Therefore, the contact angle examples given above for the first surface apply here for the wetting of the third and fourth surfaces by the first fluid.

Further, in the first configuration, the second fluid wets the first surface with a third contact angle β and the second fluid wets the second surface with a fourth contact angle (not indicated). The third contact angle is greater than the fourth contact angle as the first surface is less wettable to the second fluid than the second surface. The third contact angle is greater than 90 degrees and may be greater than 95 or 100 degrees, and the fourth contact angle is less than 90 degrees and may be less than 85 or 80 degrees. The first surface may be hydrophobic. The second surface may be hydrophilic or less hydrophobic than the first surface. In this embodiment the third and fourth surfaces are also hydrophobic. The hydrophobic material used may be for instance an amorphous fluoropolymer layer such as AF1600 or AF1601, provided by the company DuPont, or any other low surface energy polymer. The thickness of the hydrophobic layer may be between 300 and 800 nm. The hydrophilic material may be SU8.

Figure 4:
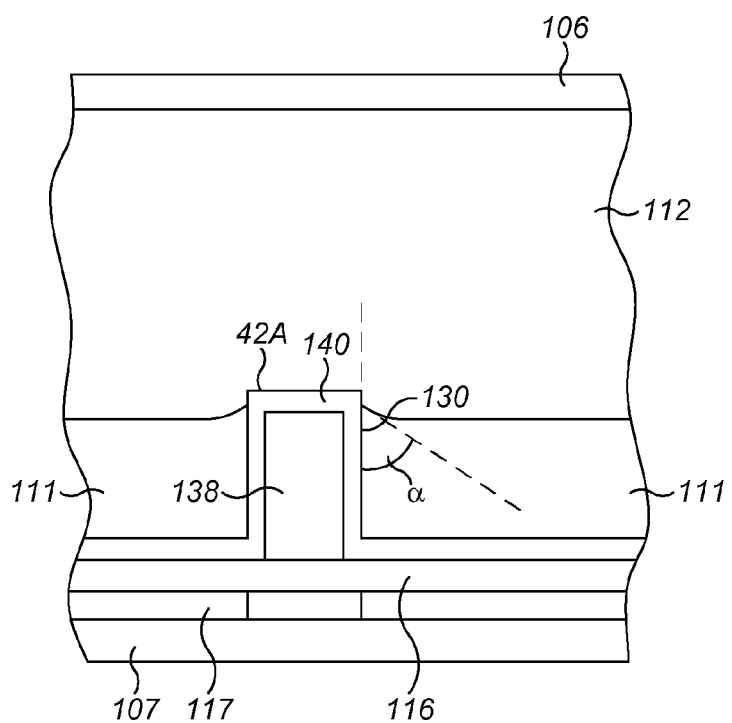
FIG. 4 shows schematically part of a display device of a different embodiment.

In the embodiment of FIG. 3, the first surface is wet by the first and second fluids. FIG. 4 illustrates an alternative embodiment of the first wall; similar features as described previously are referred to here using the same reference numerals incremented by 100, and corresponding descriptions should be taken to apply here also. The first wall 42A in this embodiment is similar in construction to the first wall 20A of FIG. 3, but is lower in height. Specifically, the first wall 42A has a height such that the first surface 130 is wet only by the first fluid 111 by the first contact angle α, in the first configuration. The second fluid 112 therefore does not wet the first surface 130 in the first configuration. The height of the first wall 42A is selected to confine the first fluid to the picture element, taking into account the possibility that part of the first fluid may creep up the first surface owing to its affinity for being wet by the first fluid. As the third and fourth surfaces are substantially the same as the first surface, the height of the third and fourth walls may be the same as the first wall 42A. The second wall may also be the same height as the first wall 42A. Alternatively, in further embodiments, the walls may be of different heights, for example with some being wet in the first configuration only by the first fluid and others by both the first and second fluids.

Referring back to FIGS. 1 to 3, in this embodiment the first surface and the second surface are arranged relative to each other to define a preferential direction PD of motion of the first fluid when switching from the first configuration to the second configuration. Motion of the first fluid initiates at the first surface before initiating at the second surface when switching from the first configuration to the second configuration. Motion may also initiate at the third and fourth surfaces before the second surface, as the third and fourth surfaces have substantially the same wettability as the first surface. Indeed, initiation may not even occur at the second surface. Instead, the first fluid may collect at the second surface.

In this example the third and fourth surfaces are also arranged to define the preferential direction. The preferential direction PD is in this example perpendicularly away from the first surface and towards the second surface where the first fluid collects when switching from the first configuration.

Figure 5:
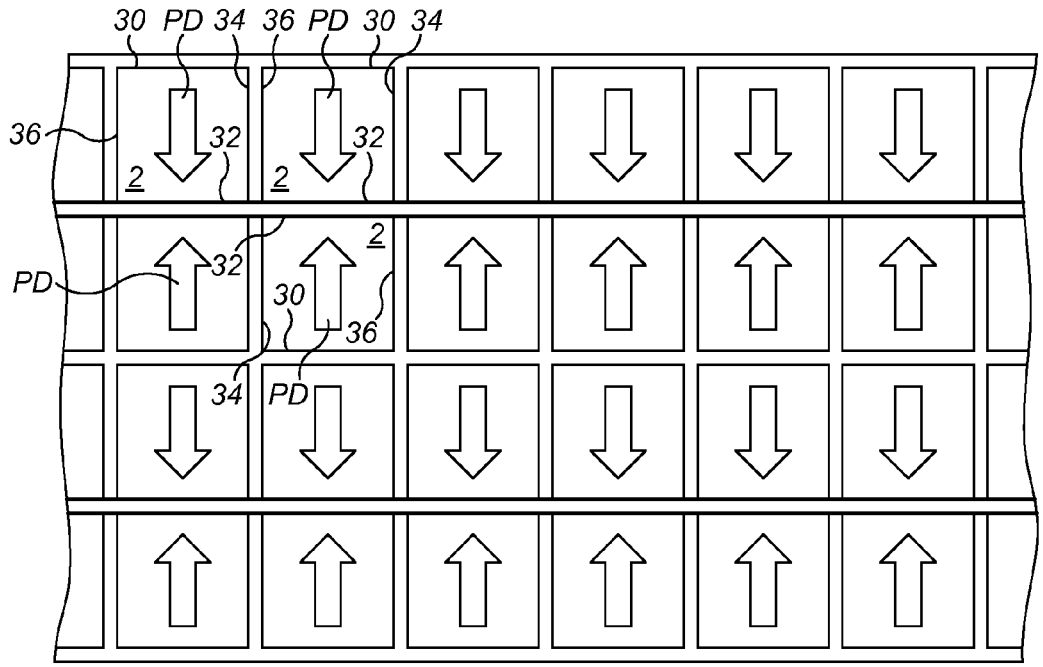
FIGS. 5 and 6 show fluid motion according to different embodiments.

FIG. 5 shows schematically a preferential direction PD of motion of the first fluid for a matrix of picture elements 2 according to the example of FIGS. 1 to 3. As can be seen, the first fluid moves towards the second surface 32 of each picture element, away from the first surface 30. Further, the first and second walls of one picture element are each the first and second walls, respectively, of a different, adjacent picture element. Therefore, the orientation of the preferential directions PD are different depending on the picture element in question.

Figure 6:
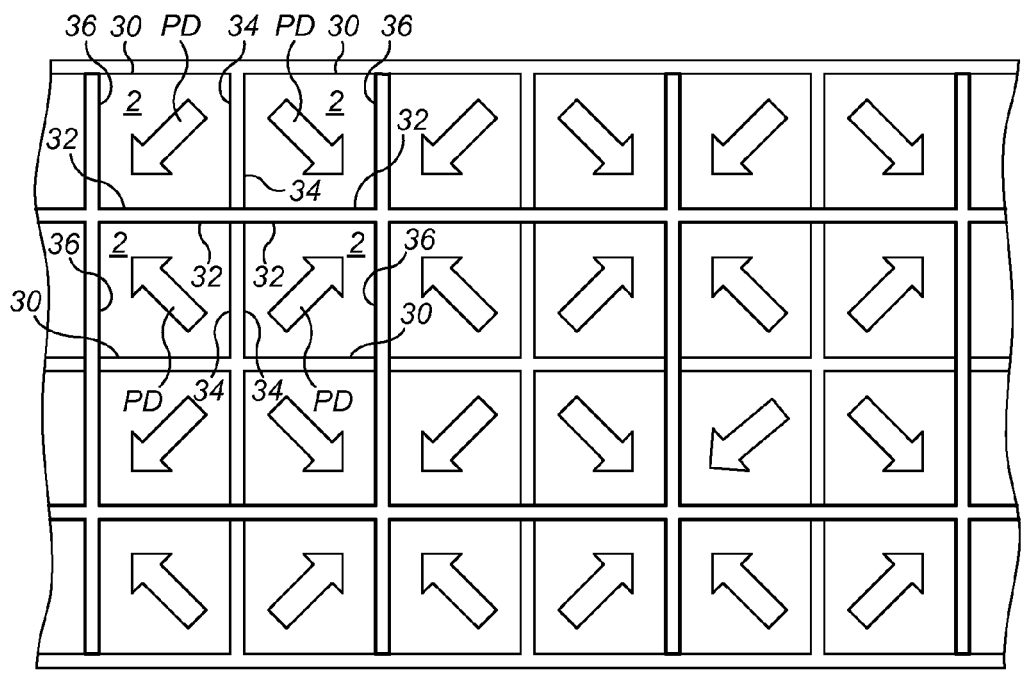

FIG. 6 shows schematically a matrix of picture elements according to a different embodiment. The construction of each picture element is the same or similar as those embodiments described previously, except for the arrangement of the third and fourth surfaces. In this embodiment, the third surface has substantially the same wettability to the second fluid as the first surface and the fourth surface has substantially the same wettability to the second fluid as the second surface. Thus the first and third walls have a similar construction and the second and fourth walls have a similar construction. This results in first fluid motion initiation at a corner of the picture element between the first and third surfaces, and for a preferential direction PD of first fluid motion in a diagonal direction from that corner towards a corner of the picture element between the second and fourth surfaces. In an example of such an embodiment, a low driving voltage of −13 V gives a 60% white area of a picture element; a maximal white area of 83% may be obtained with a voltage of −30 V. In comparison, a known picture element may achieve a 60% white area at a voltage of −20V.

It is to be envisaged that alternative arrangements of the first, second, third and fourth surfaces may be provided to determine a desired first fluid motion initiation and preferential direction of first fluid motion. The skilled person would readily understand how to implement such embodiments. For example, the third and fourth surfaces may have substantially the same wettability as the second surface.

According to further embodiments, an electrowetting device comprises a first fluid, a second fluid immiscible with the first fluid, and at least one wall confining the first fluid, wherein the at least one wall comprises a first surface which, when a zero voltage is applied to the second fluid, is wet by the first fluid with a first contact angle of less than 90 degrees. Embodiments have been described above with a first surface in accordance with these further embodiments, specifically those embodiments where, with the first fluid in the first configuration, the first fluid wets the first surface with a contact angle of less than 90 degrees, thus giving low friction between the second fluid and the first surface. Further embodiments are envisaged, which are not limited to the embodiments described previously. Embodiments may be any device which utilises electrowetting, for example a lens system or a rear view mirror. Moreover, embodiments are envisaged where the electrowetting device is an electrowetting display device comprising a picture element which comprises the first and second fluids, the at least one wall defining a perimeter of a display area of the picture element. Thus, embodiments of an electrowetting display device are envisaged which take advantage of the low friction properties of the first surface. The skilled person would readily realise such embodiments, for example a picture element where the at least one wall comprises four surfaces, to define a square display area, where each of the four surfaces is in accordance with the first surface.

Figure 7:
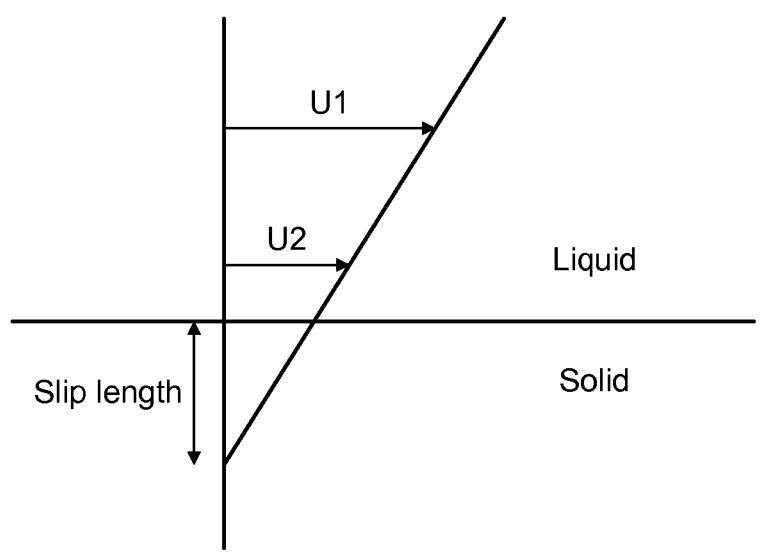
FIG. 7 shows a slip length in relation to equation 1 below.

The low friction between the second fluid and the first surface may be considered using equation 1:

$$F_{electrostatic} = ma + F_{friction} \qquad (1)$$

where $F_{electrostatic}$ is the electrostatic force for switching the fluids from the first configuration to the second configuration, m is the mass of the second fluid, a is the acceleration of the second fluid, and $F_{friction}$ is the friction force between the second fluid and the first surface where $F_{friction} = -(\text{Viscosity/Slip Length}) \times U$; where U is the second fluid velocity, the viscosity is of the second fluid, and the slip length is illustrated in FIG. 7, where U1 and U2 illustrated are the velocity vectors at the solid/fluid boundary and are in the middle of the fluid flow. The unit for the $F_{friction}$ is N, the unit for viscosity is Pa·s, the unit for the slip length is m, and the unit of U is m/s. According to equation 1, the electrostatic force may therefore be reduced by reducing the friction force $F_{friction}$.

Embodiments may be manufactured as follows, although the skilled person will readily understand that alternative methods may be used. This example will be given for the embodiment described using FIGS. 1 to 3. Firstly, the first support plate is assembled by first providing the electrode structure and the barrier layer on the substrate. Then, the first, third and fourth wall structures are formed on the barrier layer from a photoresist material for example any suitable photoresist material such as KMPR, SU8 or AZ1518 which are well known. A hydrophobic material, for example AF1600 is spin coated over the barrier layer and the wall structures. The hydrophobic layer is then exposed to reactive ionic etching, which lowers a hydrophobicity of the surface of the hydrophobic layer for application of the second wall material. The second wall is then formed by providing for example SU8 material using photo-lithography at the appropriate locations on the reduced hydrophobicity surface. Finally, the hydrophobicity of the hydrophobic layer is increased by temperature annealing. This completes assembly of the first support plate. The first and second fluids are then provided between the first and second support plates (the second support plate being a substrate in this example), the first and second support plates are brought together and are sealed to form a display device.

The above embodiments are to be understood as illustrative examples, and further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. An electrowetting display device comprising a picture element comprising a first fluid and a second fluid immiscible with the first fluid, the picture element having a display area and at least one wall forming a perimeter of the display area and confining the first fluid to the display area, wherein the at least one wall comprises a first surface and a second surface at different locations on the perimeter, the first surface being less wettable to the second fluid than the second surface.

2. An electrowetting display device according to claim 1, a configuration of the first and second fluids being switchable in dependence on a voltage applied to the second fluid, wherein when switching from a first configuration with a zero applied voltage, to a different, second configuration with a non-zero applied voltage, a motion of the first fluid initiates at the first surface before initiating at the second surface.

3. An electrowetting display device according to claim 2, wherein the first surface and the second surface are arranged relative to each other to provide a preferential direction of motion of the first fluid when switching from the first configuration to the second configuration.

4. An electrowetting display device according to claim 2, the at least one wall comprising a third surface and a fourth surface, the third surface having substantially the same wettability to the second fluid as the first surface and the fourth surface having substantially the same wettability to the second fluid as one or more of: the first surface and the second surface, wherein the first, second, third and fourth surfaces are arranged relative to each other to provide a preferential direction of motion of the first fluid when switching from the first configuration to the second configuration.

5. An electrowetting display device according to claim 1, wherein the at least one wall comprises a third surface and a fourth surface each having substantially the same wettability to the second fluid as the first surface.

6. An electrowetting display device according to claim 1, wherein the at least one wall comprises a third surface having substantially the same wettability to the second fluid as the first surface, and a fourth surface having substantially the same wettability to the second fluid as the second surface.

7. An electrowetting display device according to claim 1, the at least one wall comprising a third surface and a fourth surface, the third surface having substantially the same wettability to the second fluid as the first surface and the fourth surface having substantially the same wettability to the second fluid as one or more of: the first surface and the second surface, wherein the first, second, third and fourth surfaces form one or more of: a square or rectangular display area perimeter.

8. An electrowetting display device according to claim 1, wherein when a zero voltage is applied to the second fluid, the first fluid wets the first surface with a first contact angle and the first fluid wets the second surface with a second contact angle, the first contact angle being less than the second contact angle.

9. An electrowetting display device according to claim 8, wherein the first contact angle is less than 90 degrees.

10. An electrowetting display device according to claim 8, wherein the second contact angle is greater than one or more of: 90 degrees, 95 degrees and 100 degrees.

11. An electrowetting display device according to claim 8, wherein when the zero voltage is applied to the second fluid, the second fluid wets the first surface with a third contact angle and the second fluid wets the second surface with a fourth contact angle, the third contact angle being greater than the fourth contact angle.

12. An electrowetting display device according to claim 11, wherein the first contact angle is less than 90 degrees and the third contact angle is greater than 90 degrees.

13. An electrowetting display device according to claim 11, wherein the second contact angle is greater than one or more of: 90 degrees, 95 degrees and 100 degrees and the fourth contact angle is less than one or more of: 90 degrees, 85 degrees and 80 degrees.

14. An electrowetting display device according to claim 1, wherein the first surface is hydrophobic and the second surface is hydrophilic.

15. An electrowetting display device according to claim 1, wherein a surface of the display area joins the first surface and has substantially the same wettability to the second fluid as the first surface.

16. An electrowetting display device according to claim 15, wherein the first surface and the surface of the display area are formed from a continuous layer of material less wettable to the second fluid than the second surface.

17. An electrowetting display device according to claim 16, the at least one wall comprising a third surface and a fourth surface, the third surface having substantially the same wettability to the second fluid as the first surface and the fourth surface having substantially the same wettability to the second fluid as the first surface, wherein said continuous layer comprises the third surface and the fourth surface.

18. An electrowetting display device according to claim 16, the at least one wall comprising a third surface and a fourth surface, the third surface having substantially the same wettability to the second fluid as the first surface and the fourth surface having substantially the same wettability to the second fluid as the second surface, wherein said continuous layer comprises the third surface.

19. A support plate for an electrowetting display device comprising a picture element comprising a first fluid and a second fluid immiscible with the first fluid, the support plate comprising a display area for the picture element and at least one wall forming a perimeter of the display area and suitable for confining the first fluid to the display area, wherein the at least one wall comprises a first surface and a second surface at different locations of the perimeter, the first surface being less wettable for the second fluid than the second surface.

20. An electrowetting device comprising a first fluid, a second fluid immiscible with the first fluid, and at least one wall confining the first fluid, wherein the at least one wall comprises a first surface which, when a zero voltage is applied to the second fluid, is wet by the first fluid with a first contact angle of less than 90 degrees.

21. An electrowetting device according to claim 20, wherein one or more of the following apply: the first surface extends over a height of the at least one wall, the first surface is a face of the at least one wall, and the first surface is hydrophobic.

22. An electrowetting device according to claim 20, wherein the first contact angle is less than one or more of: 85 degrees and 80 degrees.

23. An electrowetting device according to claim 20, wherein when a zero voltage is applied to the second fluid, the second fluid wets the first surface with a third contact angle of greater than 90 degrees.

24. An electrowetting device according to claim 20, wherein the electrowetting device is an electrowetting display device comprising a picture element which comprises the first and second fluids, the at least one wall forming a perimeter of a display area of the picture element.

25. A support plate for an electrowetting display device comprising a picture element comprising a first fluid and a second fluid immiscible with the first fluid, the support plate comprising a display area for the picture element and at least one wall providing a perimeter of the display area and suitable for confining the first fluid to the display area, wherein the at least one wall comprises a first surface which, when a zero voltage is applied to the second fluid, is wet by the first fluid with a first contact angle of less than 90 degrees.

* * * * *